(12) United States Patent
Lerman

(10) Patent No.: US 8,370,669 B2
(45) Date of Patent: Feb. 5, 2013

(54) MEMORY DEVICE HAVING A MEMORY SLEEP LOGIC AND METHODS THEREFOR

(75) Inventor: Mikhael Lerman, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 720 days.

(21) Appl. No.: 12/201,695

(22) Filed: Aug. 29, 2008

(65) Prior Publication Data

US 2010/0058089 A1  Mar. 4, 2010

(51) Int. Cl.
*G06F 1/00* (2006.01)
(52) U.S. Cl. ........................................ 713/324
(58) Field of Classification Search ......... 713/300–340; 365/227
See application file for complete search history.

(56) References Cited

U.S. PATENT DOCUMENTS

| | | | |
|---|---|---|---|
| 5,222,239 A * | 6/1993 | Rosch | 713/322 |
| 5,892,729 A * | 4/1999 | Holder, Jr. | 365/233.1 |
| 6,243,820 B1 * | 6/2001 | Rosch | 713/322 |
| 6,894,503 B2 * | 5/2005 | Shi et al. | 324/537 |
| 7,355,440 B1 * | 4/2008 | Santurkar et al. | 326/38 |
| 7,863,971 B1 * | 1/2011 | Nayak et al. | 327/546 |
| 8,041,914 B2 * | 10/2011 | Fukatani et al. | 711/165 |
| 2003/0114205 A1 * | 6/2003 | Yamashita | 455/574 |
| 2007/0156060 A1 * | 7/2007 | Cervantes | 600/534 |

FOREIGN PATENT DOCUMENTS

EP  549154 A2 *  6/1993

* cited by examiner

*Primary Examiner* — Paul R Myers
(74) *Attorney, Agent, or Firm* — Faegre Baker Daniels LLP

(57) ABSTRACT

A memory device includes memory sleep logic operative to detect a repetitive pattern within at least one memory block, and place the memory block into a sleep mode in response to detecting the repetitive pattern. The memory device memory sleep logic may also provide a response to read commands to the memory block while it is in sleep mode, where the response is a constant output for any address location of the memory block. The memory device memory sleep logic may include pattern detection logic, associated with each memory block, to detect the repetitive pattern; and data port logic, coupled to the pattern detection logic, operative to receive an activation command from the pattern detection logic, and operative to return a constant output pattern in response to any read command to read data from the memory block.

22 Claims, 5 Drawing Sheets

MEMORY DEVICE HAVING A MEMORY SLEEP LOGIC AND METHODS THEREFOR

FIELD OF THE DISCLOSURE

The present disclosure is related to memory devices and integrated circuit memory devices.

BACKGROUND

An important consideration in the design of electronic devices such as, but not limited to, computers, handheld portable devices such as a Personal Digital Assistant (PDA), mobile telephones, etc., is to control the power consumed by a battery contained within the electronic device. By designing electronic devices to have a reduced consumption of battery power by the various components, the usage time per battery charge is extended and the user experience with the device is enhanced. Therefore various components such as, but not limited to, integrated circuits, or portions of circuitry or modules contained on an integrated circuit, may be shut down, or switched into a reduced power mode, during certain instances of operation of the device such that the power consumed by the particular component is reduced.

Memory components present particular difficulties with respect to power reduction in that the memory elements on a device may need to be accessed at any particular time. Therefore if a memory element is placed into a sleep mode, or powered off, time is required and consumed in turning the memory device back on, or pulling it out of the sleep state, in order for read or write operations to resume. As a result of this time delay, applications may experience corresponding time delays and therefore the user experience may be diminished as the user is forced to wait, for example, for applications or displays to refresh or obtain data so that further operation may continue. Additionally, larger memories not only increase power consumption but also generate heat and may thus raise a device's operating temperature.

Therefore a need exists for improved memory devices having reduced battery power consumption.

DETAILED DESCRIPTION

The embodiments disclosed herein provide a memory device including a plurality of memory blocks; and memory sleep logic operative to detect a repetitive pattern within at least one memory block of the plurality of memory blocks, and place the at least one memory block into a sleep mode in response to detecting the repetitive pattern. The memory device memory sleep logic may be further operative to provide a response to read commands to the at least one memory block, while said at least one memory block is in sleep mode, where the response is a constant output for any address location of the at least one memory block.

The memory device memory sleep logic may further include pattern detection logic, associated with the at least one memory block, and operative to detect the repetitive pattern; and data port logic, operatively coupled to the pattern detection logic, and operative to receive an activation command from the pattern detection logic, where the pattern detection logic sends the activation command in response to detecting the repetitive pattern, and the data port logic returns a constant output pattern in response to a read command to read data from the memory block.

The embodiments also provide a method including detecting, by memory sleep logic, a repetitive pattern within at least one memory block of a plurality of memory blocks within a memory device; and placing the at least one memory block into a sleep mode in response to detecting the repetitive pattern. The method may include providing a response to read commands to the memory block, while the memory block is in sleep mode, where the response is a constant output for any specified address location of the memory block.

The embodiments also provide a computer readable memory comprising executable instructions for execution by at least one processor, that when executed cause an integrated circuit fabrication system to provide a plurality of memory blocks; and provide memory sleep logic operative to detect a repetitive pattern within a memory block and place the memory block into a sleep mode in response to detecting the repetitive pattern.

Figure 1:
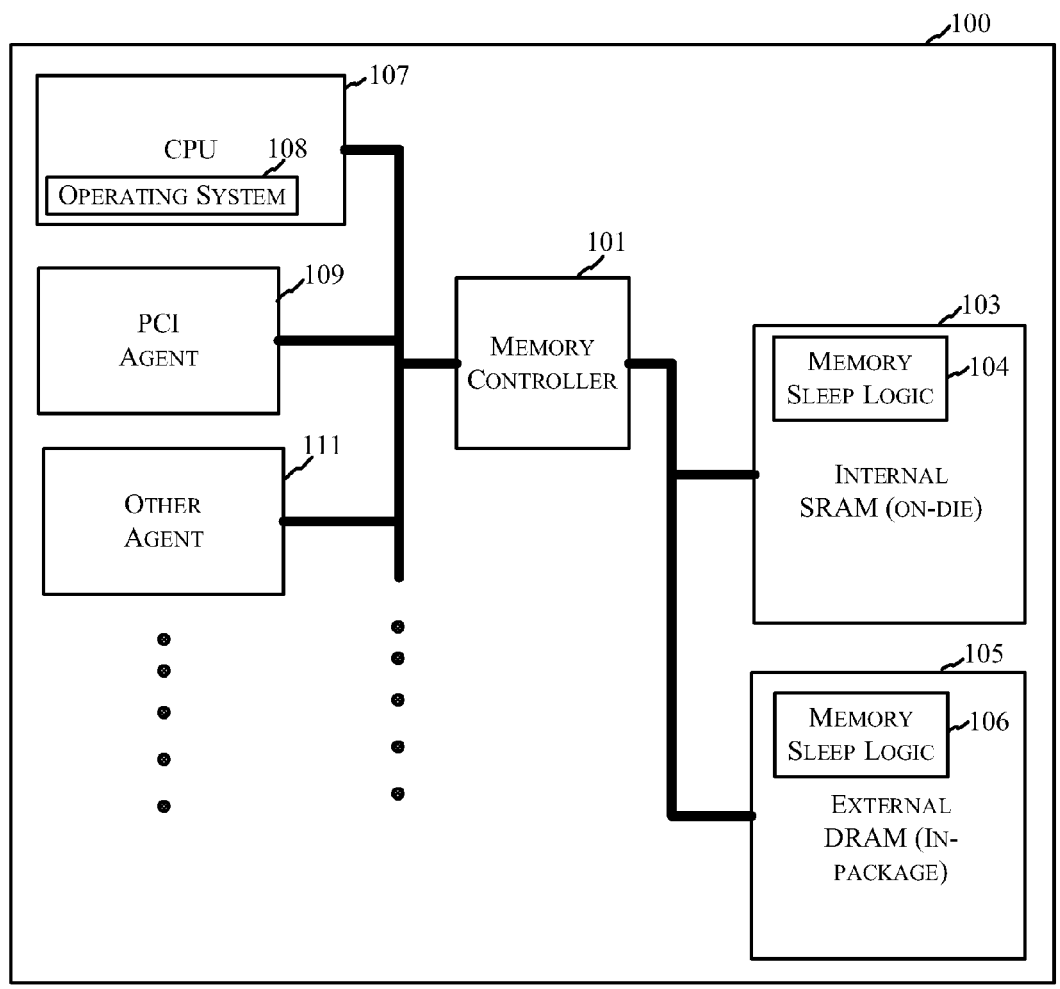
FIG. 1 is a block diagram of an electronic device 100 in accordance with the various embodiments.

Turning now to the drawings wherein like numerals represent like components, FIG. 1 illustrates an electronic device 100 in accordance with the various embodiments. The electronic device 100 includes a Central Processing Unit ("CPU") 107 running an operating system 108, a PCI agent 109 and various other agents such as, but not limited to, other agent 111. The CPU 107, PCI agent 109 and other agents 111, communicate by a communications bus with a memory controller 101. The memory controller 101 is further operatively coupled to various memory devices which may be on-die or in-package of an integrated circuit. For example, the electronic device 100 may include an internal, on-die, Static Random Access Memory (SRAM) such as internal SRAM 103. Further, the electronic device 100 may communicate with an external, in-package, Dynamic Random Access Memory (DRAM) such as external DRAM 105. External DRAM 105 may be located off the die of a primary integrated circuit, but in the package of the integrated circuit.

In accordance with the embodiments, all memory elements contained within the electronic device 100 include a memory sleep logic. For example, internal SRAM 103 includes memory sleep logic 104 and external DRAM 105 includes memory sleep logic 106. In accordance with the embodiments, the memory sleep logic 104, and memory sleep logic 106, allow memory blocks to be placed into a sleep mode, transparently with respect to how the respective memory elements communicate with various other components of the electronic device 100 as will be described herein.

Figure 2:
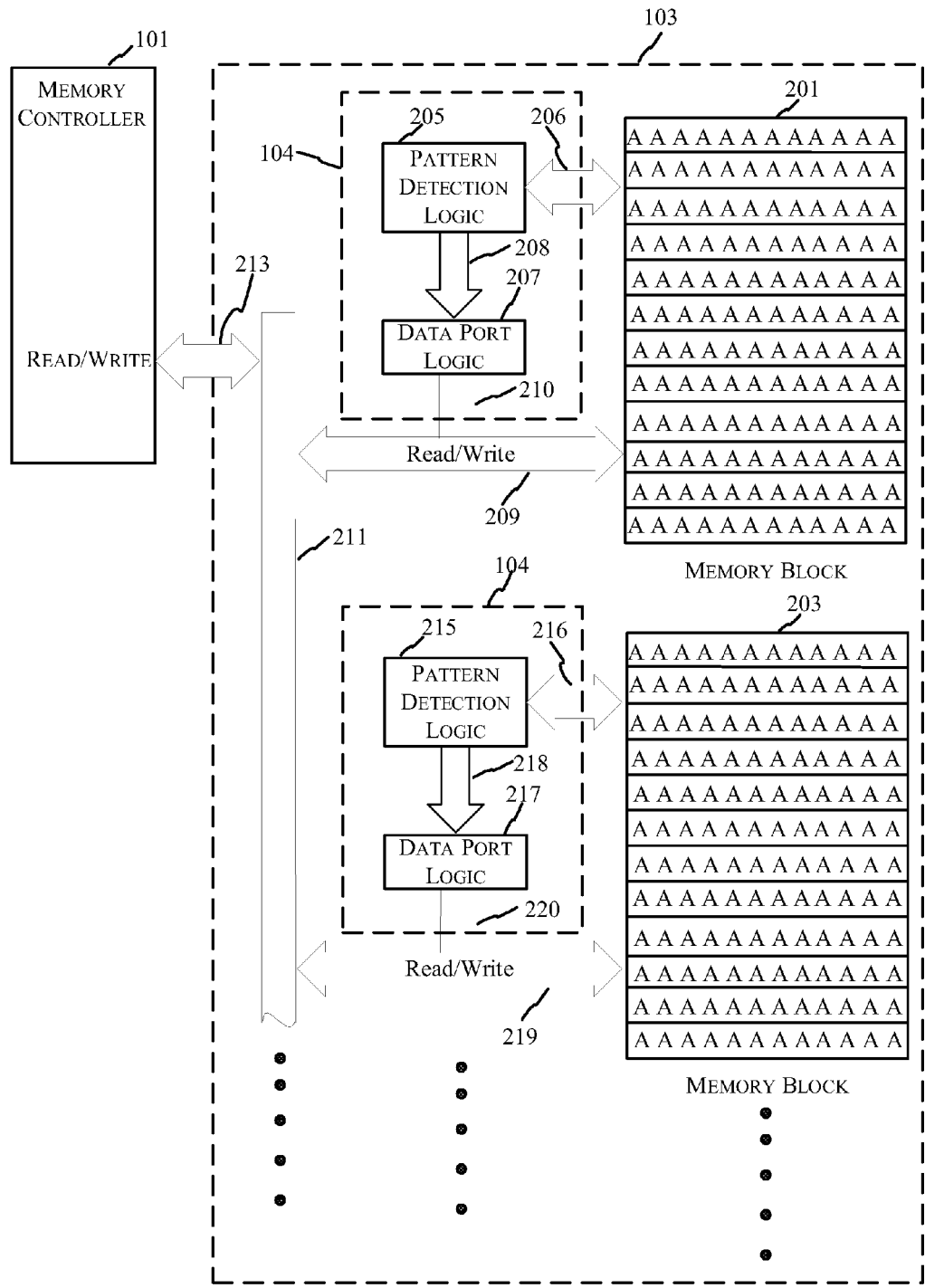
FIG. 2 is a block diagram a memory element in accordance with the embodiments, and shows further details of internal SRAM 103 of FIG. 1.

FIG. 2 illustrates further details of a memory element in accordance with the embodiments. For example, in FIG. 2, further details of internal SRAM 103 are provided. As shown in FIG. 2, internal SRAM 103 includes a plurality of memory blocks such as memory block 201 and memory block 203. The various memory blocks of the memory device 103 may be accessed by the memory controller 101 for read/write access. For example, the memory controller 101 may have a read/write access interface 213 to the SRAM 103. As shown, the read/write interface 213 may be operatively coupled to a communication bus 211, which is further coupled to read/write buses such as read/write bus 209 and read/write bus 219, which provide read/write access to memory block 201 and memory block 203, respectively.

It is to be understood that FIG. 2, and the other figures provided in the present disclosure, are for illustrative purposes only. The purpose of the illustrations is to explain to one of ordinary skill in the art how to make and use the herein disclosed embodiments. Therefore the figures are limited to showing and describing the elements necessary to facilitate an understanding, by one of ordinary skill in the art, of how to make and use the described embodiments. Therefore the various figures, such as FIG. 2, are not intended to be complete schematic representations of the various components and devices illustrated, but, rather, are intended to illustrate the components of the various embodiments and the interrelation and connections of those components to other components of the device. For example, the communication bus 211 and read/write buses 209 and 219 may be constructed or arranged in any suitable manner, as would be understood by one of ordinary skill, and would remain in accordance with the various embodiments herein disclosed.

Further for illustrative purposes, memory block 201 and memory block 203 are shown having a repetitive repeating pattern of hexadecimal numerals. As would be understood by those of ordinary skill, repetitive patterns may occur in a memory block at various instances of operation. For example, memory associated with a display processor may contain repetitive patterns corresponding to continuous areas of an image displayed on an electronic display. One such example, among other possible examples, is a display of a city skyline having a blue sky behind the buildings of the skyline. The area of the display representing the blue sky would have a corresponding repeating pattern of binary digits contained within blocks of the memory, such as the repeating pattern shown in memory block 201 of SRAM 103. Various other applications, other than image processing, may also produce repetitive patterns for certain instances of the application as would be understood by those of ordinary skill.

Additionally, memory may contain repetitive patterns when it has been unused for a period of time and not accessed by any application of the electronic device. For example, upon initial power up of an electronic device, all memory elements may be clear such that those memory elements contain a repetitive pattern. However, memory elements storing useful data, such as application data, or application code, would not necessarily be repetitive in that the pattern may vary, or may vary only with respect to one or more memory blocks contained within the memory, such as SRAM 103.

Among other advantages, the various embodiments disclosed herein make use of repetitive patterns within memory to determine when memory blocks contained within the memory device, such as SRAM 103, may be powered down such that battery power of an electronic device may be conserved. Thus, in FIG. 2 the SRAM 103 includes the memory sleep logic 104 in accordance with the embodiments. The memory sleep logic 104 provides, for each memory block contained within the SRAM 103, a pattern detection logic and a data port logic. For example, with respect to memory block 201, the memory sleep logic 104 includes pattern detection logic 205 which is operatively coupled, via a communication bus 208, to data port logic 207. The pattern detection logic 205 is operatively coupled to the memory block 201 via communication bus 206. The data port logic 207 is operatively coupled to the read/write bus 209 by bus 210. Therefore read/write commands from memory controller 101 may be received over communication bus 210 by the data port logic 207.

In accordance with the embodiments, each memory block includes a corresponding memory sleep logic. Therefore, memory block 203 includes pattern detection logic 215 coupled to the memory block via the communication bus 216, and coupled to data port logic 217 by communication bus 218. The data port logic 217 is coupled to read/write bus 219 by communication bus 220. This logic continues as described for the number of memory blocks contained within the SRAM 103 as shown in FIG. 2.

The term "logic" as used herein includes software and/or firmware executing on one or more programmable processors, ASICs, DSPs, hardwired logic or combinations thereof. Therefore, in accordance with the embodiments, the pattern detection logic, data port logic and the overall memory sleep logic, may be implemented in any appropriate fashion as would be understood by one of ordinary skill and would remain in accordance with the embodiments herein disclosed.

In operation of the embodiments, the pattern detection logic, for example pattern detection logic 205, may detect that memory block 201 contains a repetitive pattern of data such as the repetitive pattern shown in FIG. 2. If such a repetitive pattern is detected in the memory block, the pattern detection logic 205 will place with memory block 201 into a sleep mode. The terminology "sleep mode," as used herein, may include various device states. For example, a sleep mode may include a stand-by state in which the memory block may be powered off, but where system clocks, that are operatively coupled to the memory device, may still be active.

For example, in the various embodiments, one memory block may be powered off while other memory blocks remain active and thus still require system clock activity to remain operational. In accordance with the various embodiments, a sleep mode may also include a suspend state. The suspend state may be defined as when a given number of memory blocks within the SRAM 103 are turned off, with only predefined memory blocks remaining powered on. In accordance with the embodiments therefore, any combination of memory blocks, or predefined numbers of memory blocks, may be turned on or off, or placed into a stand-by state as was described above, or configured in any other suitable way so as to conserve battery power.

Therefore, in accordance with the embodiments, a sleep mode of a memory block or a memory device may include a range of operations predetermined to conserve power consumption by the memory device as whole. Further in accordance with the embodiments, the capability of achieving an improved power consumption by the memory device is achieved by dividing the memory device into a plurality of memory blocks or memory slots, as illustrated by memory block 201 and memory block 203, for example, in FIG. 2. As illustrated in FIG. 2, the pattern detection logic 205, being coupled to the memory block 201 via communication bus 206, will detect a repetitive pattern contained within memory block 201. Based on detection of the repetitive pattern, the pattern detection logic 205 will place the memory block 201 into a sleep mode as was discussed above. The pattern detection logic 205 will then enable the data port logic 207 via the communication bus 208. The data port logic 207 will effectively intercept read commands from the memory controller 201 via the communication bus 210 to read/write bus 209.

For example, if a device such as the CPU 107 accesses the memory controller 101 to perform a read of memory block 201, the data port logic 207 will intercept this read command. The data port logic 207 will, in response to the read command, provide to the memory controller a repetitive pattern. The repetitive pattern may correspond to the repetitive pattern detected in the memory block 201, or may be some other appropriate predetermined constant pattern programmed into the data port logic 207 for the purposes of responding to a read command when the memory block 201 is placed in a sleep mode. In any case, a device, such as CPU 107, accessing the memory block 201 when it is in the sleep state, will receive a constant pattern and will interpret the constant pattern to indicate that the memory is empty or, in other words, that the memory does not contain any data. Therefore, in accordance with the embodiments, the data port logic 207 acts as a substitute of the memory block 201 for the purpose of responding to read commands, through the memory controller 101, by various devices of an electronic device. Further therefore, in accordance with the embodiments, a memory block is considered idle or inactive, if the entire block is filled with a constant pattern.

If, however, the pattern detection logic 205 detects, for example, at least two different words within the memory block 201, the memory block 201 will be considered active and will not be placed into a sleep mode. Other embodiments may include other requirements for determining whether a memory block is active, and detecting at least two different words is only one example of how this may be achieved in the various embodiments. The data port logic 207 will return the constant pattern described, regardless of what memory address is provided, in the read command. In other words, a read command directed to any address of memory block 201 will result in the data port logic 207 returning the same constant output pattern to the external devices. The memory thus appears to function normally, and no interruption is caused by the memory block, of the various memory blocks within the SRAM 103, being placed into sleep mode. Thus, operation of various embodiments is transparent to the outside world.

In the event that a write command is received via the memory controller 101, the data port logic will not respond with the constant output pattern. In this case, the overall memory sleep logic 104, or in some embodiments the pattern detection logic 205, will detect that a write command was received over the communication bus 210 and, in response, will place the memory block 201 back into a powered up state and out of the sleep mode. Because write commands are normally sent to the memory block without waiting for an acknowledgement or return of data, enough time is provided to power-on the memory block prior to receiving a subsequent read command from the memory controller 101. Therefore, in the various embodiments, even though time is required to bring the memory block out of the sleep mode when a write command has been received, the time is sufficient to maintain the transparency of operation to the outside world. That is, transparency of operation is maintained with respect to the other devices/components within electric device 100.

Figure 3:
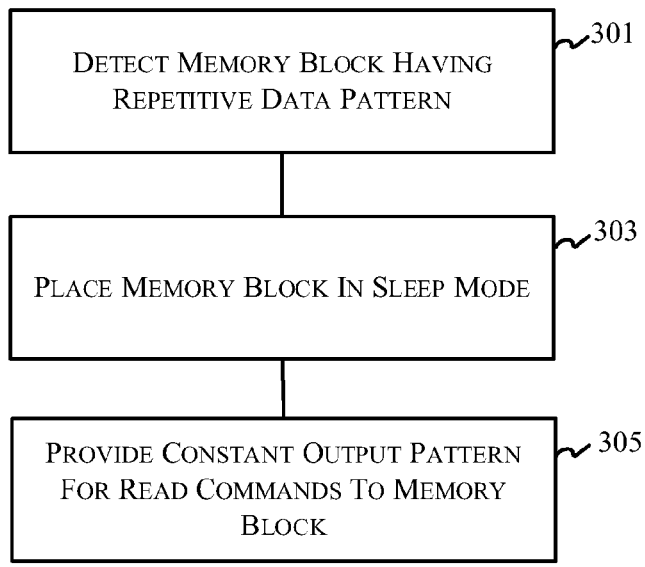
FIG. 3 is a flow chart illustrating the general operation of a memory device in accordance with the embodiments.

FIG. 3 illustrates the general operation of a memory device in accordance with the embodiments. Thus in 301, a memory sleep logic of the embodiments detects a memory block having a repetitive data pattern. For different embodiments, different and more sophisticated data patterns and data port logic may be implemented corresponding to specific memory devices. For example, for a graphics memory, the data port logic may include intelligently programmed word sizes or block sizes to achieve an even better power savings result overall for the memory device. One example, among a plurality of possible examples, could be logic for detection of a texture pattern used by a graphics processor. For example, a brick texture may be used in certain images wherein the brick texture is partitioned as squares or rectangles within an image. Therefore the bit pattern corresponding to the textured "brick" may repeat for a given number of bits, that is, for a given word size. Thus, when such known patterns are known to occur, these patterns may be pre-programmed into the data port logic such that they may be detected. When occurring within the memory block, those portions of the memory block corresponding to the detected predetermined repetitive patterns may then be powered off as was described previously.

Further, the data port logic may be dynamically programmable in some embodiments such that a number of known patterns may be added to, upgraded, or changed. Thus in accordance with the embodiments and as shown in 303, the memory block is placed in sleep mode. In 305 a constant output pattern is provided in response to read commands to the memory block, regardless of what address within the memory block is specified.

As would be understood by one of ordinary skill, various applications that access the memory, and corresponding memory blocks, will fill the memory up as necessary during normal operation of the application. For example, one or more memory blocks may be completely filled, or partially filled, with data such as application data which was needed during operation of the application. When the application is shut down, the memory may continue to contain the data that was previously used by the application. However, once the application is turned off, much of the data, or all of the data, may not be useful, or may in other words become "garbage" data that has no use other than its previous use by its corresponding application. Therefore, returning to FIG. 1, the operating system 108 may include a feature, in accordance with the embodiments, wherein after an application is shut down, the operating system 108 automatically clears areas of memory or memory blocks accessed by the corresponding application.

Figure 5:
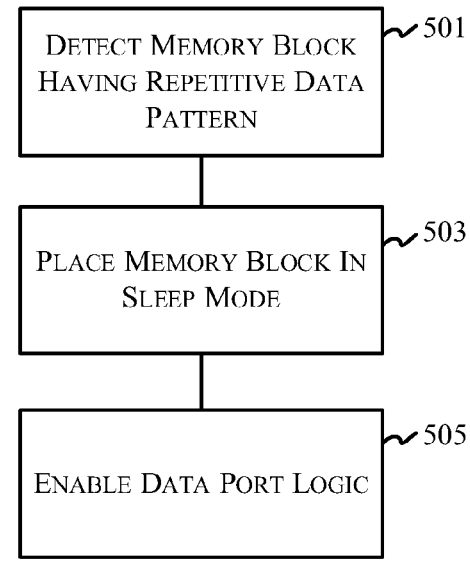
FIG. 5 is a flow chart illustrating operation of pattern detection logic in accordance with the embodiments.
Figure 4:
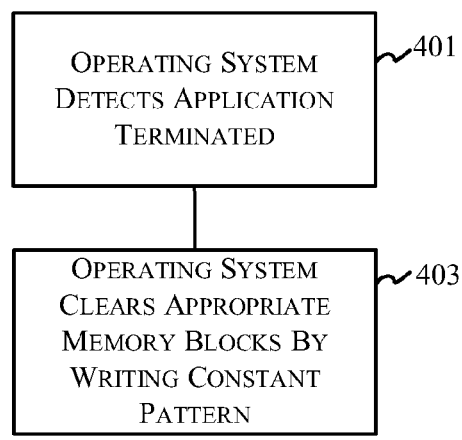
FIG. 4 illustrates operation of an operating system that detects that an application has terminated and clears the appropriate memory blocks by writing a constant pattern, in accordance with the embodiments.

Therefore, as shown in FIG. 4 block 401, the operating system detects that an application has terminated. In 403 the operating system clears the appropriate memory blocks by writing a constant pattern to that memory block or blocks. FIG. 5 is a flow chart illustrating operation of a pattern detection logic in accordance with the embodiments.

In 501, the pattern detection logic detects a memory block having a repetitive data pattern or otherwise detects that there is a repetitive pattern contained by a specific memory block. In 503, the pattern detection logic places the memory block into a sleep mode based on detecting that the memory block contained the repetitive pattern. In 505, the pattern detection logic enables a data port logic.

Figure 6:
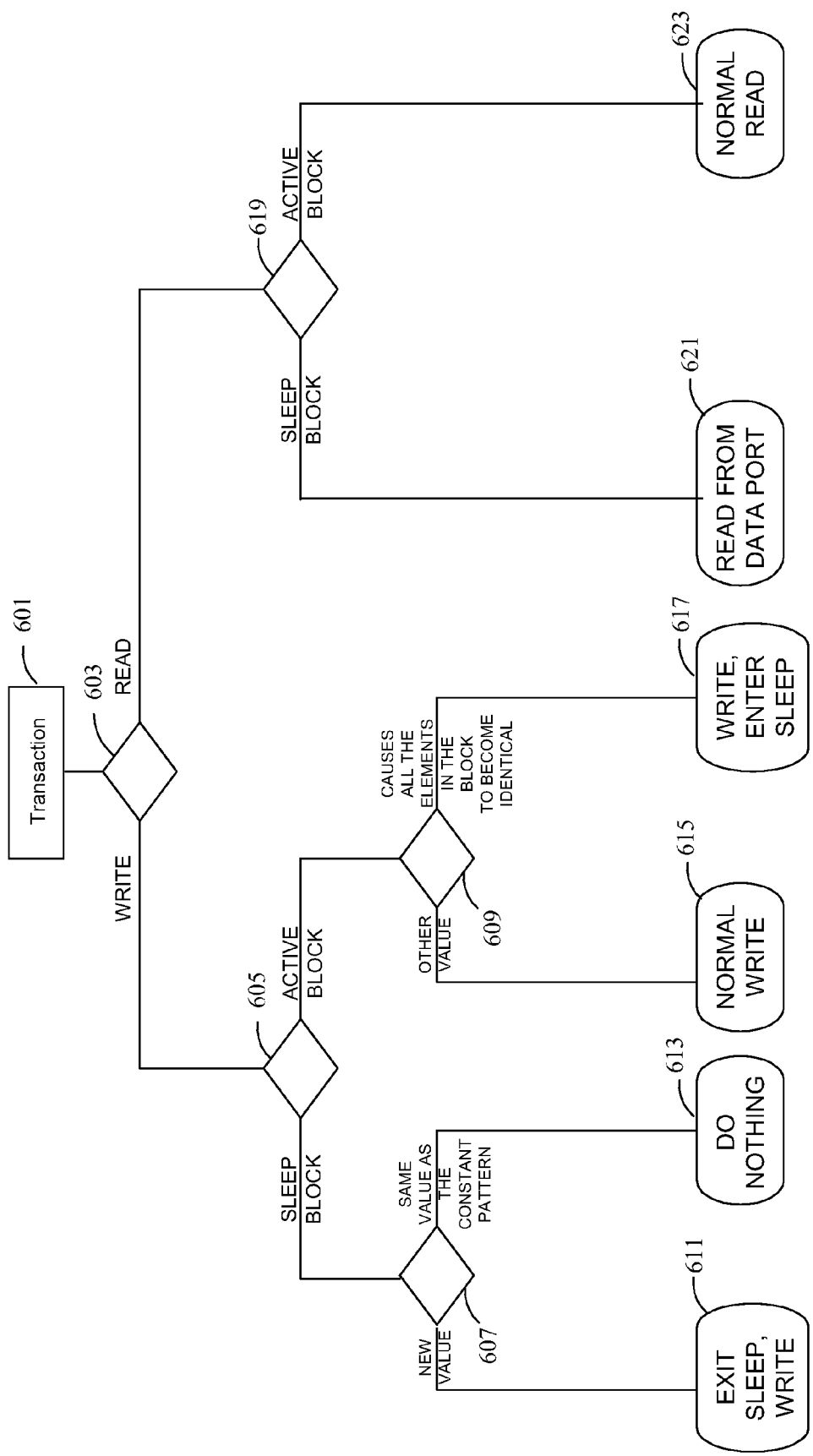
FIG. 6 is a flow chart illustrating additional details of operation of a memory in accordance with the embodiments.

FIG. 6 provides further details of operation of a memory in accordance with the embodiments. A memory transaction 601 may be a read or write operation as shown by decision block 603. For a read operation the memory block addressed by the read may be either an actice block or a sleep block as shown by 619. For an active memory block, a normal read 623 will be performed. However, if the memory block is a sleep block in 619, then the read will be from the data port logic as shown in 621.

For write operations, the memory block may also be a sleep block or active block as shown by 605. For a sleeping memory block, if the value to be written is the same as the constant pattern already present in the memory block, as shown in 607, nothing will be done as shown in 613. However, if the value to be written is a new value, then, as shown in 611, the memory block will exit the sleep mode and the new value will be written.

For active memory blocks, a write that would cause all address locations of the memory block to become identical in 609, would, after the write operation in 617, further cause the memory block to enter a sleep mode. Therefore, in the various embodiments, memory blocks may be forced into a sleep mode by writing such constant patterns to all address locations within the memory block. As shown in 609, any other value would result in a normal write operation as shown in 615.

Figure 7:
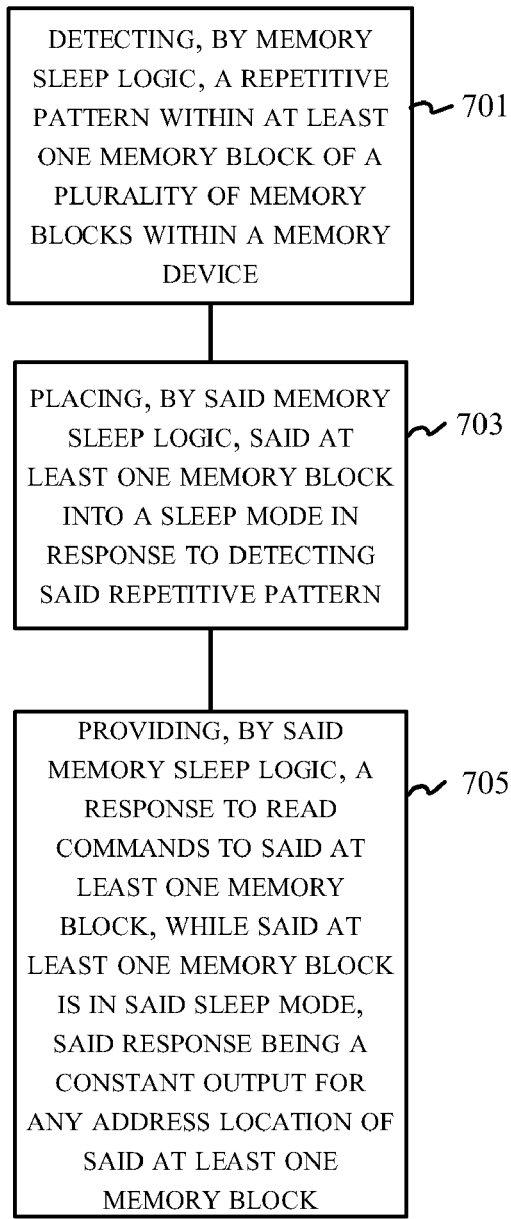
FIG. 7 illustrates a method of operation of a memory device in accordance with the embodiments.

FIG. 7 illustrates a method of operation of a memory device in accordance with the embodiments. For example, in 701, the method includes detection, by a memory sleep logic, of a repetitive pattern within at least one memory block of a plurality of memory blocks within a memory device. In 703 the method continues with placing, by said memory sleep logic, the at least one memory block into a sleep mode in response to detecting the repetitive pattern. In 705, the memory sleep logic provides a response to read commands to at least one memory block, while the memory block is in a sleep mode and where the response is a constant output for any specified address location of the at least one memory block.

Figure 8:
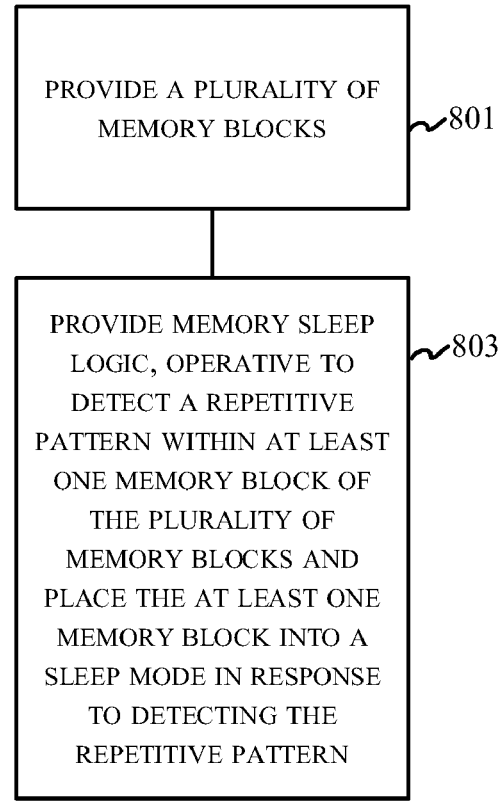
FIG. 8 illustrates a method of fabricating or building a memory device in accordance with the embodiments.

FIG. 8 illustrates a method of fabricating or building a memory device in accordance with the embodiments. The method illustrated in FIG. 8 may be implemented in a Hardware Description Language (HDL) code or via a Netlist as would be understood by one of ordinary skill. Therefore in FIG. 7, block 801, a plurality of memory blocks is provided. In 803, the method provides memory sleep logic operative to detect a repetitive pattern within at least one memory block of a plurality of memory blocks, and place at least one of the memory blocks into a sleep mode in response to detecting a repetitive pattern.

Therefore memory devices and methods of operation have been disclosed herein wherein the memory devices include a memory sleep logic that may detect repetitive patterns occurring within various blocks of the memory, and, in response to detecting those repetitive patterns, place the corresponding memory blocks into a sleep mode for the purposes of conserving power consumption by the memory device. Further, the various embodiments contemplate preprogramming of various known repetitive patterns into the memory sleep logic such that those patterns may be detected within memory as words or within subsections of a memory block. In response the memory block may be placed into a sleep mode, and/or portions of said memory block may be placed into a sleep mode in accordance with some embodiments. Other variations that would be equivalent to the herein disclosed embodiments may occur to those of ordinary skill in the art and would remain in accordance with the spirit and scope of embodiments as defined herein by the following claims.

What is claimed is:

1. A memory device comprising:
    memory sleep logic, operative during a non-test mode, to detect a repetitive pattern within a plurality of memory blocks and place at least one of the plurality of memory blocks into a sleep mode during the non-test mode in response to detecting said repetitive pattern.

2. The memory device of claim 1, wherein said memory sleep logic is further operative to provide a response to read commands to said at least one memory block, while said at least one memory block is in said sleep mode, said response being a constant output for any address location of said at least one memory block.

3. The memory device of claim 1, wherein said memory sleep logic further comprises:
    pattern detection logic, associated with said at least one memory block of said plurality of memory blocks, said pattern detection logic operative to detect said repetitive pattern within said at least one memory block; and
    data port logic, operatively coupled to said pattern detection logic, said data port logic operative to receive an activation command from said pattern detection logic, said pattern detection logic sending said activation command in response to detecting said repetitive pattern, said data port logic being operative to activate in response to said activation command, and return a constant output pattern in response to a read command to read data from said at least one memory block.

4. The memory device of claim 1, wherein each specific memory block of said plurality of memory blocks comprises:
    an associated component of said memory sleep logic, said associated component of said memory sleep logic operative to detect a repetitive pattern within a specific memory block of said plurality of memory blocks, said specific memory block being associated with said associated component of said memory sleep logic.

5. The memory device of claim 3, wherein said data port logic is operatively coupled to a read/write port of said memory device, and is further operative to return said constant output pattern via said read/write port.

6. The memory device of claim 1, wherein said memory device is a static random access memory or a dynamic random access memory.

7. An integrated circuit comprising the memory device of claim 1.

8. A method comprising:
    detecting, by memory sleep logic during a non-test mode, a repetitive pattern within a plurality of memory blocks within a memory device; and
    placing, by said memory sleep logic during the non-test mode, at least one of the plurality of memory blocks into a sleep mode in response to detecting said repetitive pattern.

9. The method of claim 8, further comprising:
    providing, by said memory sleep logic, a response to read commands to said at least one memory block, while said at least one memory block is in said sleep mode, said response being a constant output for any address location of said at least one memory block.

10. The method of claim 8, wherein said memory sleep logic comprises pattern detection logic and wherein detecting, by memory sleep logic, a repetitive pattern, includes:
    detecting, by said pattern detection logic, said repetitive pattern within said at least one memory block.

11. The method of claim 9, wherein said memory sleep logic comprises pattern detection logic and data port logic and wherein providing, by said memory sleep logic, a response to read commands to said at least one memory block, includes:
    detecting, by said pattern detection logic, said repetitive pattern within said at least one memory block;
    receiving, by said data port logic, an activation command from said pattern detection logic, said pattern detection logic sending said activation command in response to detecting said repetitive pattern, said data port logic being operative to activate in response to said activation command; and
    returning, by said data port logic, a constant output pattern in response to a read command to read data from said at least one memory block.

12. The method of claim 11, wherein returning, by said data port logic, a constant output pattern in response to a read command to read data from said at least one memory block, further comprises:
    returning said constant output via a read/write port of said memory device.

13. A computer readable memory comprising:
    executable instructions for execution by at least one processor, that when executed cause an integrated circuit fabrication system to:
    provide a plurality of memory blocks; and
    provide memory sleep logic, said memory sleep logic operative to detect a repetitive pattern within a plurality of memory blocks during a non-test mode and place at least one of the plurality of memory blocks into a sleep mode in response to detecting said repetitive pattern.

14. The computer readable memory of claim 13, wherein said executable instructions, when executed further cause the one or more processors to:
    provide said memory sleep logic wherein said memory sleep logic is further operative to provide a response to read commands to said at least one memory block, while said at least one memory block is in said sleep mode, said response being a constant output for any address location of said at least one memory block.

15. The computer readable memory of claim 14, wherein said executable instructions, when executed further cause the one or more processors to:
   provide pattern detection logic, associated with said at least one memory block of said plurality of memory blocks, said pattern detection logic operative to detect said repetitive pattern within said at least one memory block; and
   provide data port logic, operatively coupled to said pattern detection logic, said data port logic operative to receive an activation command from said pattern detection logic, said pattern detection logic sending said activation command in response to detecting said repetitive pattern, said data port logic being operative to activate in response to said activation command, and return a constant output pattern in response to a read command to read data from said at least one memory block.

16. The computer readable memory of claim 15, wherein said executable instructions, when executed further cause the one or more processors to:
   provide an integrated circuit including a memory device, comprising:
      a plurality of memory blocks; and
      memory sleep logic, said memory sleep logic operative to detect a repetitive pattern within at least one memory block of said plurality of memory blocks and place said at least one memory block into a sleep mode in response to detecting said repetitive pattern.

17. The memory device of claim 6 wherein the static random access memory or dynamic random access memory comprises the plurality of memory blocks and wherein the memory sleep logic is operative to, during a non-test mode, detect a repetitive pattern within at least one memory block of the plurality of memory blocks in the memory device and place said at least one memory block into the sleep mode in response to detecting said repetitive pattern.

18. A memory device comprising:
   memory sleep logic, said memory sleep logic operative to detect a repetitive pattern within at least one memory block of a plurality of memory blocks and place said at least one memory block into a sleep mode in response to detecting said repetitive pattern; and
   wherein said memory sleep logic is further operative to provide a response to read commands to said at least one memory block, while said at least one memory block is in said sleep mode, said response being a constant output for any address location of said at least one memory block.

19. A method comprising:
   detecting, by memory sleep logic, a repetitive pattern within at least one memory block of a plurality of memory blocks within a memory device;
   placing, by said memory sleep logic, said at least one memory block into a sleep mode in response to detecting said repetitive pattern; and
   providing, by said memory sleep logic, a response to read commands to said at least one memory block, while said at least one memory block is in said sleep mode, said response being a constant output for any address location of said at least one memory block.

20. The method of claim 19, wherein said memory sleep logic comprises pattern detection logic and data port logic and wherein providing, by said memory sleep logic, a response to read commands to said at least one memory block, includes:
   detecting, by said pattern detection logic, said repetitive pattern within said at least one memory block;
   receiving, by said data port logic, an activation command from said pattern detection logic, said pattern detection logic sending said activation command in response to detecting said repetitive pattern, said data port logic being operative to activate in response to said activation command; and
   returning, by said data port logic, a constant output pattern in response to a read command to read data from said at least one memory block.

21. A computer readable memory comprising:
   executable instructions for execution by at least one processor, that when executed cause an integrated circuit fabrication system to:
      provide a plurality of memory blocks; and
      provide memory sleep logic, said memory sleep logic operative to detect a repetitive pattern within at least one memory block of said plurality of memory blocks and place said at least one memory block into a sleep mode in response to detecting said repetitive pattern; and
   wherein said executable instructions, when executed further cause the one or more processors to:
      provide said memory sleep logic wherein said memory sleep logic is further operative to provide a response to read commands to said at least one memory block, while said at least one memory block is in said sleep mode, said response being a constant output for any address location of said at least one memory block.

22. The computer readable memory of claim 21, wherein said executable instructions, when executed further cause the one or more processors to:
   provide pattern detection logic, associated with said at least one memory block of said plurality of memory blocks, said pattern detection logic operative to detect said repetitive pattern within said at least one memory block; and
   provide data port logic, operatively coupled to said pattern detection logic, said data port logic operative to receive an activation command from said pattern detection logic, said pattern detection logic sending said activation command in response to detecting said repetitive pattern, said data port logic being operative to activate in response to said activation command, and return a constant output pattern in response to a read command to read data from said at least one memory block.

* * * * *